United States Patent [19]

Hieda et al.

[11] Patent Number: 5,433,541
[45] Date of Patent: Jul. 18, 1995

[54] CONTROL DEVICE FOR CONTROLLING MOVEMENT OF A PRINTING HEAD CARRIAGE AND CONTROL METHOD FOR CONTROLLING THE SAME

[75] Inventors: Tomoharu Hieda; Sunao Ishizaki, both of Tokyo, Japan

[73] Assignee: NEC Corporation, Tokyo, Japan

[21] Appl. No.: 165,714

[22] Filed: Dec. 13, 1993

[30] Foreign Application Priority Data

Dec. 15, 1992 [JP] Japan .................. 4-333942

[51] Int. Cl.⁶ .............................................. B41J 19/30
[52] U.S. Cl. ................................ 400/279; 400/322; 318/606; 388/812
[58] Field of Search ............... 400/279, 322, 320, 903; 318/606, 605, 602, 618; 388/804, 805, 811, 812, 819, 820, 902

[56] References Cited

U.S. PATENT DOCUMENTS

| | | | |
|---|---|---|---|
| 4,457,639 | 7/1984 | Nagai | 400/322 |
| 4,463,435 | 7/1984 | Cavill | 400/322 |
| 4,689,540 | 8/1987 | Tani et al. | 388/812 |
| 4,707,649 | 11/1987 | Kanemura | 400/903 |
| 4,777,609 | 10/1988 | Cavill et al. | 400/322 |
| 4,815,063 | 3/1989 | Aoshima | 388/812 |
| 4,869,610 | 9/1989 | Nishizawa et al. | 400/903 |
| 4,928,050 | 5/1990 | Torisawa | 400/903 |
| 5,204,601 | 4/1993 | Hirata et al. | 388/812 |
| 5,207,520 | 5/1993 | Tanaka | 400/903 |

FOREIGN PATENT DOCUMENTS 1234280 9/1989 Japan .................. 400/322
1238974 9/1989 Japan .................. 400/322

Primary Examiner—David A. Wiecking
Assistant Examiner—Steven S. Kelley
Attorney, Agent, or Firm—Sughrue, Mion, Zinn, Macpeak & Seas

[57] ABSTRACT

A carriage motor control device that uses speed determination means (3) for determining a set speed value (SN12) to be set on the basis of an aimed angle value (SN13A) indicative of an aimed rotation angle, an aimed speed value (SN13B) indicative of an aimed rotation speed and the rotation angle value, speed control means (4) for generating a speed control value (SN7) for making the rotation speed value closer to the set speed value on the basis of a difference between the rotation speed value and the set speed value, angle control means (5) for generating an angle control value (SN8) for making the rotation angle value closer to the aimed angle value on the basis of a difference between the aimed angle value and the rotation angle value, selection means (8) for selecting the speed control value as a motor drive control value when the rotation speed value is larger than a first speed value and selecting the angle control value as the motor drive control value when the rotation speed value is smaller than the first speed value and, drive pulse generation means (6) for generating a motor drive signal modulated according to a magnitude of the motor drive control value and for outputting the motor drive pulse signal as a forward motor drive signal or a reverse motor drive signal on the basis of the signal indicative of the direction of rotation.

21 Claims, 12 Drawing Sheets

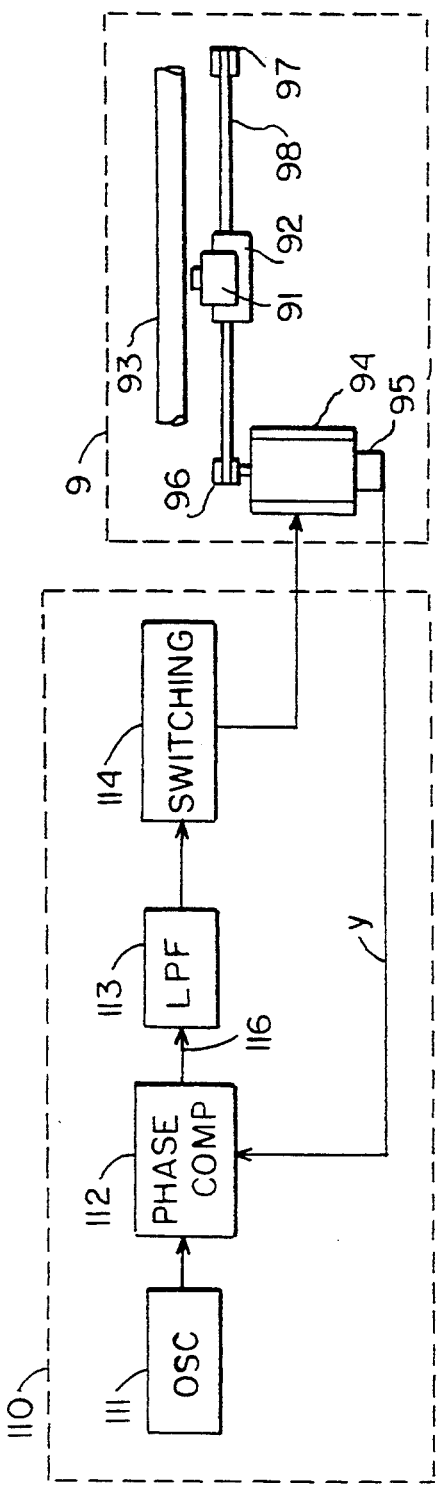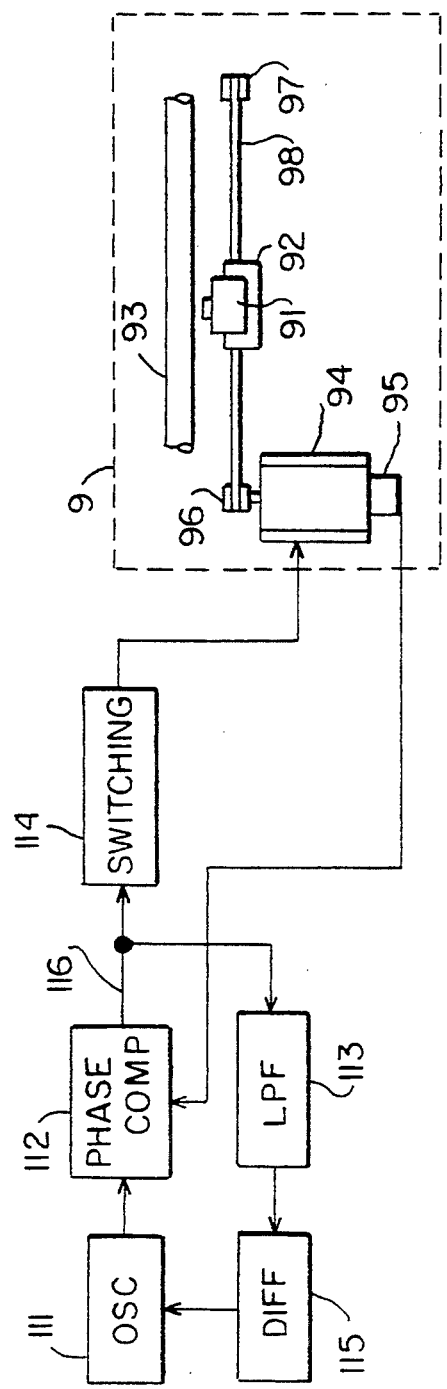

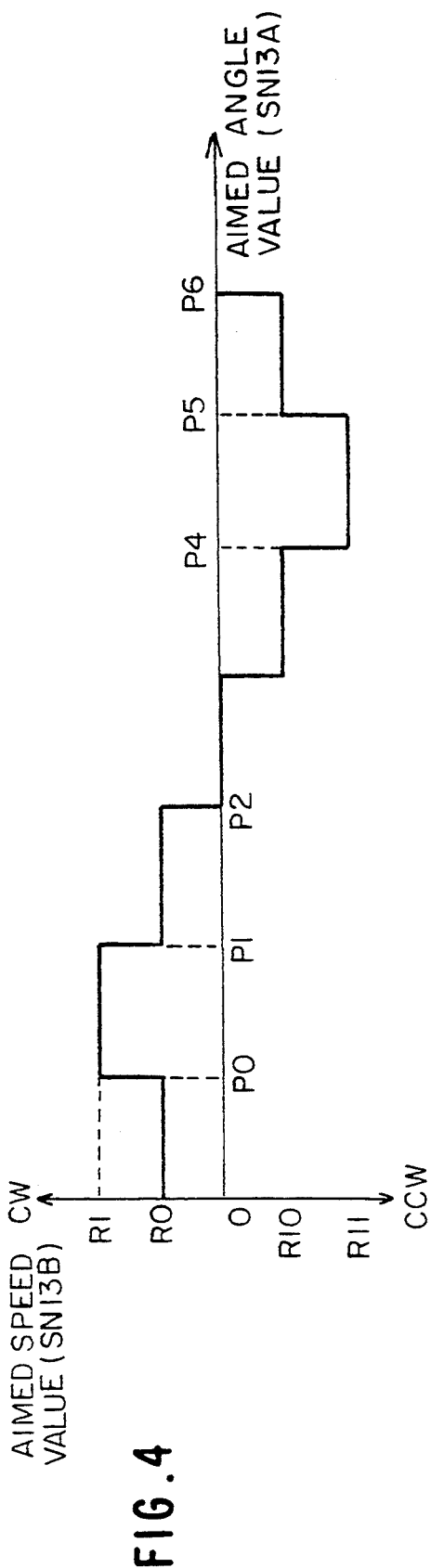
FIG. 4
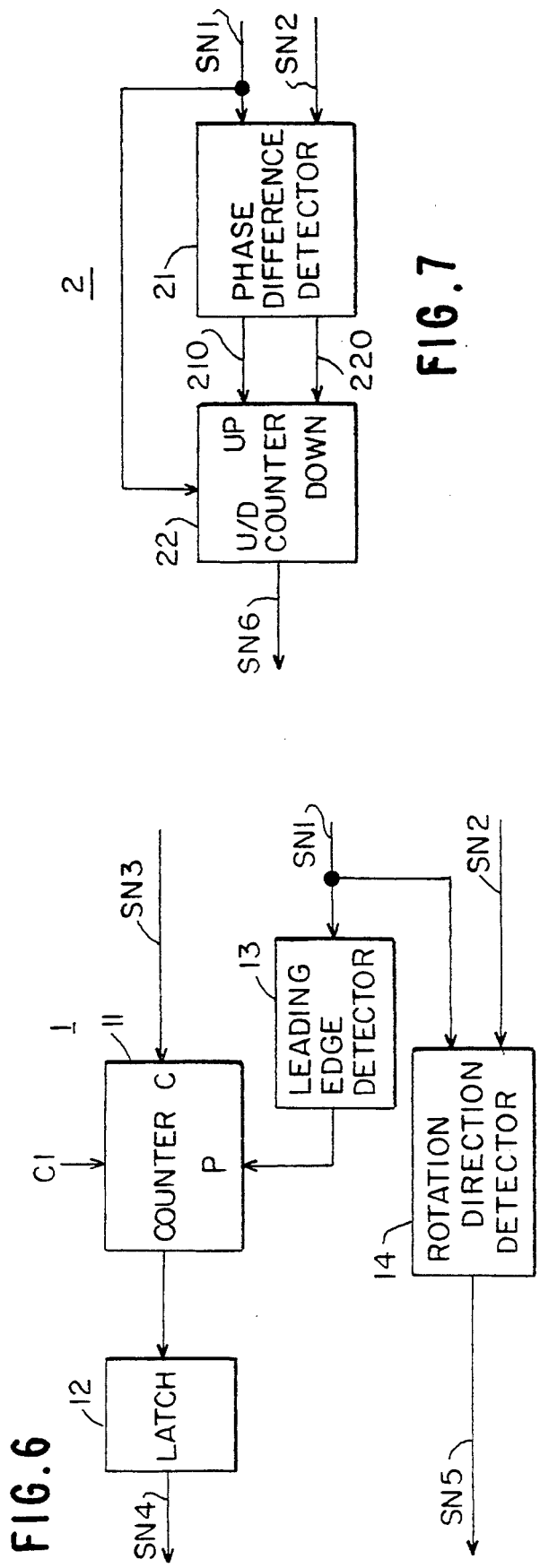
FIG. 7
FIG. 6

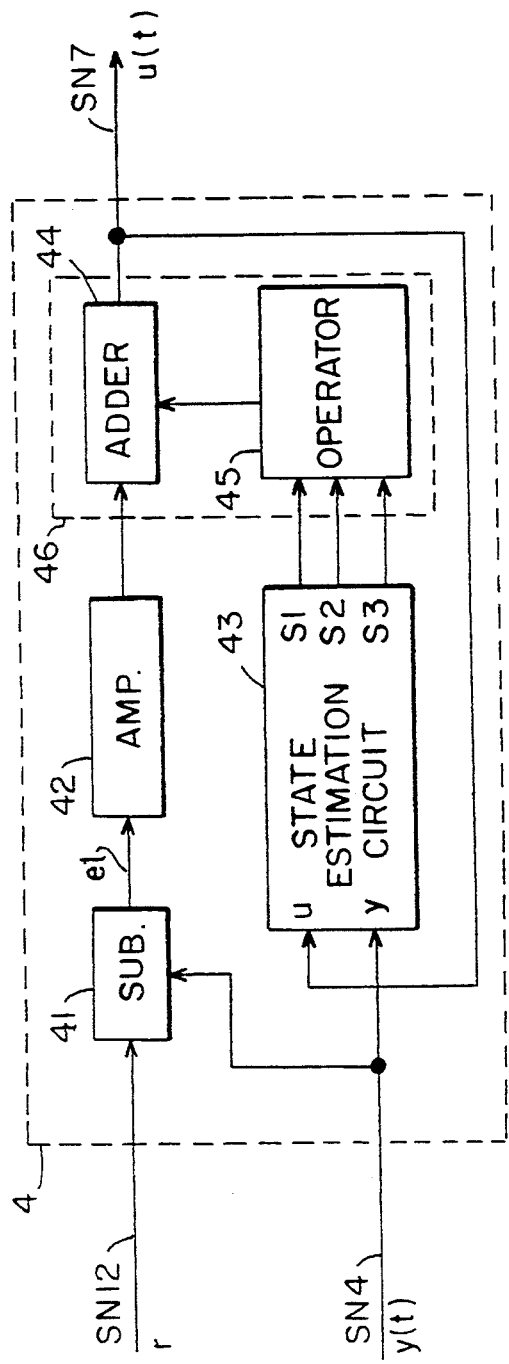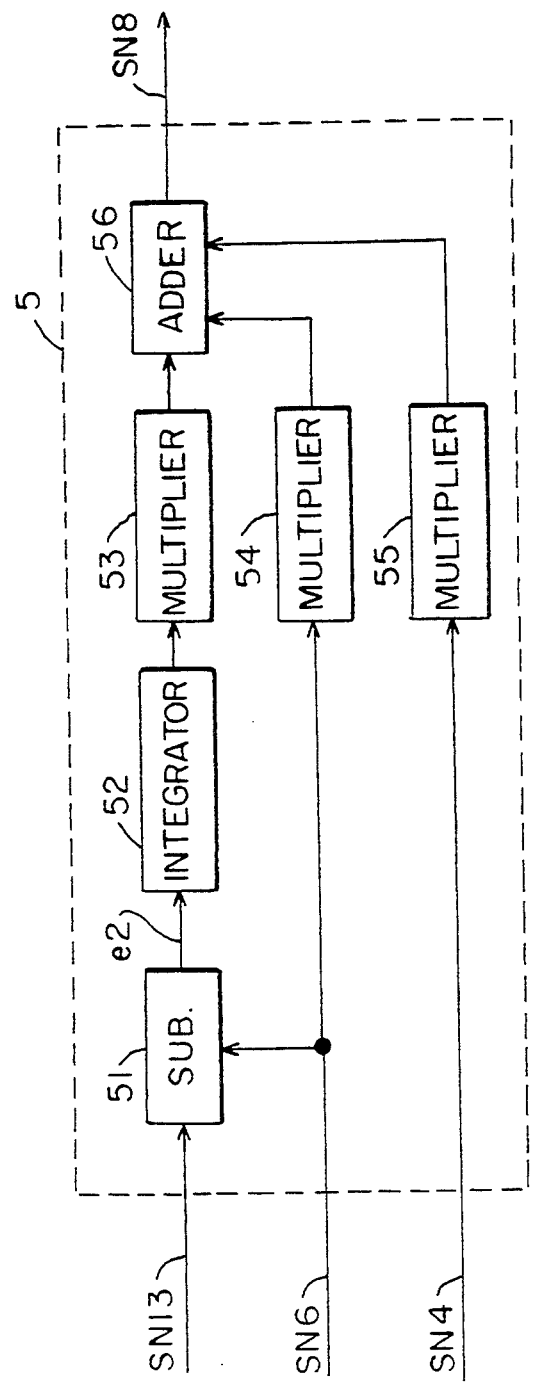
FIG.10
FIG.13

CONTROL DEVICE FOR CONTROLLING MOVEMENT OF A PRINTING HEAD CARRIAGE AND CONTROL METHOD FOR CONTROLLING THE SAME

BACKGROUND OF THE INVENTION

1. Field of the Invention

The present invention relates to a control device for controlling movement of a carriage of a printing head and, particularly, to a control device and method for controlling movement of a carriage of a printing head of a serial printer having a large inertia load and operable at high speed.

2. Description of the Prior Art

In a printer having a printing head carriage, a conventional carriage on which a printing head is fixedly mounted is moved by connecting the carriage to a motor through a power transmission mechanism comprising a wire or a timing belt and converting rotation of the motor into a linear movement of the carriage. Since, among printers, a printing head of a serial impact printer operable at high speed is heavy and in view of demand of reducing a size of the printer, a distance in which the carriage is accelerated or decelerated tends to be shortened. Therefore, vibration of the power transmission mechanism in accelerating or decelerating the carriage is propagated to the carriage and vibration of the carriage continues even after the carriage speed reaches an aimed value, resulting in degradation of printing quality.

In order to restrict such vibration and obtain a print of high quality, it has been usual to use a carriage movement control device having a follow-up control system constructed according to a direct detection method for directly detecting a moving speed of a carriage by means of a linear scale sensor (cf. Japanese Patent Application Laid-open No. Hei 1-234280) or an indirect detection method for indirectly detecting an amount of expansion or contraction of a power transmission mechanism by mounting speed sensors on pulleys on both a motor side and a driven side (Japanese Patent Application Laid-open No. Hei 1-238974).

However, the above-mentioned conventional scheme requires the expensive linear scale sensor or the expensive speed sensors on both the motor and follower sides and, further, the sensor or sensors must be mounted in place with high precision.

FIG. 1 is a block diagram showing another conventional scheme for restricting vibration and obtaining high print quality. In FIG. 1, a carriage driving mechanism 9 includes a carriage 92 on which a printing head 91 is mounted and which is connected to a power transmission mechanism 98 provided between a driving side pulley 96 and a driven side pulley 97 and an encoder 95 which detects rotation speed of a motor 94 fixedly secured to the driving side pulley 96 of the carriage driving mechanism 9. The encoder 95 may be constructed with a rotary encoder which generates 2 signals having phases different from each other by 90°. The printing head 91 prints a printing sheet which is not shown on a platen 93 through an inked ribbon which is not shown.

A control portion 110 of the carriage movement control device shown in FIG. 1 drives the motor 94 by means of a phase-locked-loop (referred to as PLL hereinafter) functioning to synchronize phase of an output of a high stability reference oscillator 111 with phase of an output pulse signal y of the encoder 95 which corresponds to rotation speed of the motor 94. A phase comparator 112 of the carriage movement control device compares phase of the output pulse signal y of the encoder 95 with phase of the output of the reference oscillator 111 and generates a phase error signal 116. The phase error signal 116 phases through a low-pass filter 113 having an amplifier function and drives the motor 94 through a drive circuit 114. The motor 94 rotates correspondingly to a voltage of the phase error signal 116 and the encoder 95 generates a frequency signal corresponding to the rotation speed. Therefore, the motor 94 and the encoder 95 operates as a voltage controlled oscillator.

In case of PLL control, a variation of moving speed of a carriage in normal condition depends upon stability of an oscillator used. Therefore, such moving speed variation can be restricted to relatively small value if a highly stable oscillator is used. However, in order to accelerate the carriage bearing a heavy load from a stationary state thereof, a wide capture range W is required for PLL control. Capture range W is width between frequency at which the PLL control is not locked and frequency at which it is locked, and can be approximated by the following equation which is well known as G. S. Moschytz's approximation:

$$W = K \cdot |F(j\omega)|$$

where K is loop gain of PLL control, $F(j\omega)$ is transfer function of the low-pass filter, $\omega$ is angular velocity of the motor and j is imaginary number unit.

When the loop gain K is made large in order to increase the capture range W, the closed loop may become unstable and oscillate. In order to solve this problem, U.S. Pat. No. 4,457,639 issued to Nagai proposes a carriage movement control device. FIG. 2 is a block diagram showing the carriage movement control device of the Nagai patent. In FIG. 2 showing a closed loop circuit including a reference oscillator 111, a phase comparator 112, a low-pass filter 113 and a differentiating circuit 115. The capture range W is widened by improving gain in a high frequency range of the low-pass filter 113 by means of the differentiating circuit 115.

In the closed loop circuit shown in FIG. 2, however, since the low-pass filter 113 and the differentiating 115 are analog circuits, respectively, the capture range W depends upon accuracy of resistors and/or capacitors used in these circuits. Further, the differentiating circuit 115 which must compensate for a large inertial load is easily affected by noise. In addition thereto, if the reference oscillator 111 is stopped to operate for some reason, the phase comparator circuit 112 shall generate a very large phase error signal 116 with which a motor 94 driven thereby shall overrun. Further, since, in this example, a position information of a carriage 92, that is, rotation angle information of the motor, is not utilized, an exact stop position of the carriage 92 can not be determined when it is to be stopped and, in the worst case, the carriage 92 may collide with a structural frame of the device.

SUMMARY OF THE INVENTION

An object of the present invention is to provide a control device and method for controlling a movement of a printing head carriage, which is capable of moving the carriage to an aimed position exactly at high speed.

Another object of the present invention is to provide a control device and method for controlling a movement of a printing head carriage, which does not use a PLL control, can be constructed with digital circuits and requires a sensor on only a motor side.

According to the control device for controlling a movement of a printing head carriage of the present invention, a motor which drives a carriage mounting a printing head thereon is driven by motor drive signal and a movement of the carriage is controlled by controlling the motor drive signal. The control device for controlling a movement of the printing head carriage according to the present invention comprises a speed detector for detecting a rotation speed of the motor and generating a rotation speed value indicative of the rotation speed and generating a signal indicative of a rotating direction of the motor, an angle detector for detecting a rotation angle of the motor and generating a rotation angle value indicative of the rotation angle of the motor from an initial position thereof, a speed determination circuit for determining a set speed value to be set on the basis of an aimed angle value indicative of an aimed rotation angle, an aimed speed value indicative of an aimed rotation speed and the rotation angle value, a speed control circuit for generating a speed control value on the basis of a difference between the set speed value from the speed determination circuit and the rotation speed value to make the rotation speed value closer to the set speed value, an angle control circuit for generating an angle control value on the basis of a difference between the aimed angle value and the rotation angle value to make the rotation angle value closer to the aimed angle value, a selector circuit for selecting the speed control value as a motor drive control value when the rotation speed value is larger than a first speed value and selecting the angle control value as the motor drive control value when the rotation speed value is smaller than the first speed value, and a drive pulse generator circuit for generating a motor drive pulse which is modulated correspondingly to a magnitude of the motor drive control value as a forward motor drive signal or a reverse motor drive signal according to a signal indicative of a rotation direction of the motor.

Furthermore, according to the present invention, a control method for controlling movement of a printing head carriage comprises the steps of detecting rotation speed value, rotation angle value and direction of rotation of a motor of a carriage moving mechanism in which the motor is connected to a printing head carriage through a power transmission mechanism, generating a speed control value so that the rotation speed value is made closer to a set speed value, generating an angle control value by means of the rotation angle value so that the latter is made closer to an aimed angle value, selecting the speed control value or the angle control value as a motor drive control value, and producing a forward or reverse motor drive signal on the basis of the motor drive control value and the direction of rotation.

With the above-mentioned construction, the motor can follow the aimed speed value and the aimed angle value exactly at high speed.

BRIEF DESCRIPTION OF THE DRAWINGS

FIG. 1 is a block diagram showing a conventional control device for controlling movement of a printing head carriage;

FIG. 2 is a block diagram showing another conventional control device for controlling movement of a printing head carriage;

FIG. 4 is a graph showing variations of an aimed angle value and an aimed speed value in the control device shown in FIG. 3;

FIG. 6 is a block diagram showing the speed detector in detail;

FIG. 7 is a block diagram showing the angle detector in detail;

FIG. 10 is a block diagram showing a speed control circuit of the control device shown in FIG. 3 in detail;

FIG. 13 is a block diagram showing an angle control circuit of the control device shown in FIG. 3 in detail;

DETAILED DESCRIPTION OF THE PREFERRED EMBODIMENT

Figure 3:
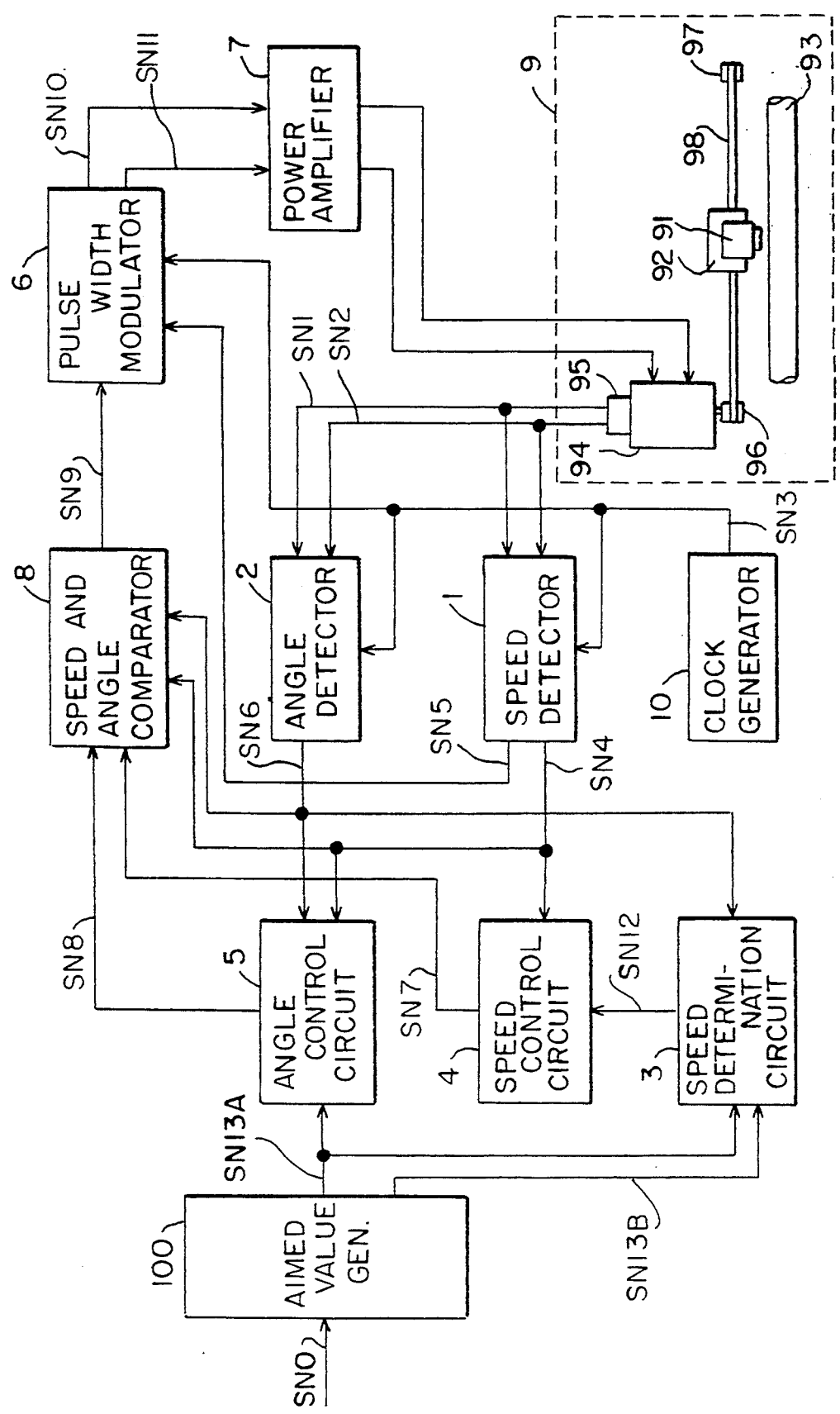
FIG. 3 is a block diagram showing a control device for controlling movement of a printing head carriage according to an embodiment of the present invention.

FIG. 3 is a block diagram of a control device for controlling movement of a printing head carriage according to an embodiment of the present invention.

In FIG. 3, an aimed value generator 100 generates an aimed angle value SN13A and an aimed speed value SN13B on the basis of data SN0 indicative of an aimed moving distance of a carriage 92 of a carriage drive mechanism 9. The aimed angle value SN13A and the aimed speed value SN13B indicate an aimed rotation angle and an aimed rotation speed of a motor 94 of the carriage drive mechanism 9, respectively, and are generated under control of a micro processor according to the aimed moving distance of the carriage 92. FIG. 4 shows variations of the aimed speed value SN13B and the aimed angle value SN13A. In FIG. 4, it is clear that aimed speed values R0 and R1 are in one rotation direction of the motor and aimed speed values R10 and R11 are in the other rotation direction. The aimed value generator 100 outputs combined aimed speed and aimed angle value data (R0, P0), (R1, P1), (R0, P2), (R10, P4), (R11, P5) and (R10, P6), sequentially. Respective portions to be described hereinafter control a movement of the carriage according these aimed values.

The carriage drive mechanism 9 includes the carriage 92 mounting the printing head 91 thereon, a power transmission mechanism (endless belt) 98 provided between a driving pulley 96 and a driven pulley 97 and having the carriage 92 fixed thereon, the motor 94 connected to the driving pulley 96, and a platen 93. An encoder 95 generates a pulse every time when the motor 94 rotates by a fixed angle and outputs a train of thus generated pulses and a train of pulses whose phase is deviated from the generated pulse train by 90° as rotation signals SN1 and SN2.

A speed detector 1 generates a rotation speed value SN4 indicative of a rotation speed of the motor 94 and a signal SN5 indicative of a rotation direction of the motor 94 on the basis of the rotation signals SN1 and SN2. An angle detector 2 generates a rotation angle value SN6 indicative of a rotation angle of the motor 94 on the basis of the rotation signals SN1 and SN2. The rotation angle value corresponds to a position of the carriage 92.

A control speed determination circuit 3 generates a set speed value SN12 on the basis of the aimed angle value SN13A, the aimed speed value SN13B and the rotation angle value SN6. In detail, the set speed value SN12 initially generated when the motor 94 is actuated, becomes an initial aimed speed value from the aimed value generator 100, that is, rotation speed value R0 in FIG. 4, and, when the rotation angle value SN6 becomes an initial aimed angle value P0, a next aimed speed value R1 becomes the set speed value SN12. That is, the control speed determination circuit 3 monitors the rotation angle value SN6 and, when it reaches the aimed angle, outputs a next aimed speed value as the set speed value SN12. A speed control circuit 4 generates a speed control value SN7 for making the rotation speed value SN4 closer to the set speed value SN12. An angle control circuit 5 generates an angle control value SN8 for making the rotation angle value SN6 closer to the aimed angle value SN13 in response to the rotation speed value SN4 and the rotation angle value SN6. A speed and angle comparator 8 outputs one of the speed control value SN7 or the angle control value SN8 as a motor drive control value SN9 according to whether or not the rotation speed value SN4 is within a predetermined control speed range. A pulse width modulator circuit 6 produces a forward motor drive pulse SN10 or a reverse motor drive pulse SN11 on the basis of the motor drive control value SN9 and a signal SN5 indicative of a rotation direction of the motor. A power amplifier 7 supplies motor drive power to the motor 94 according to the forward and reverse motor drive pulses SN10 and SN11.

This embodiment of the present invention is featured by that the control speed determination circuit 3 is supplied with the aimed angle value SN13A and the aimed speed value SN13B and sets a next aimed speed at a time when rotation angle of the motor reaches the current aimed angle and that the speed and angle comparator 8 detects a magnitude of the rotation speed value SN4 and the rotation angle value SN6 and selects the speed control value SN7 as the motor drive control value SN9 when the rotation speed value SN4 is larger than a predetermined value Es and selects the angle control value SN8 as the motor drive control value SN9 when the rotation speed value SN4 is smaller than the predetermined value Es. Therefore, it is possible to improve the accuracy of stop position of the motor without degrading high speed characteristics.

Figure 5:
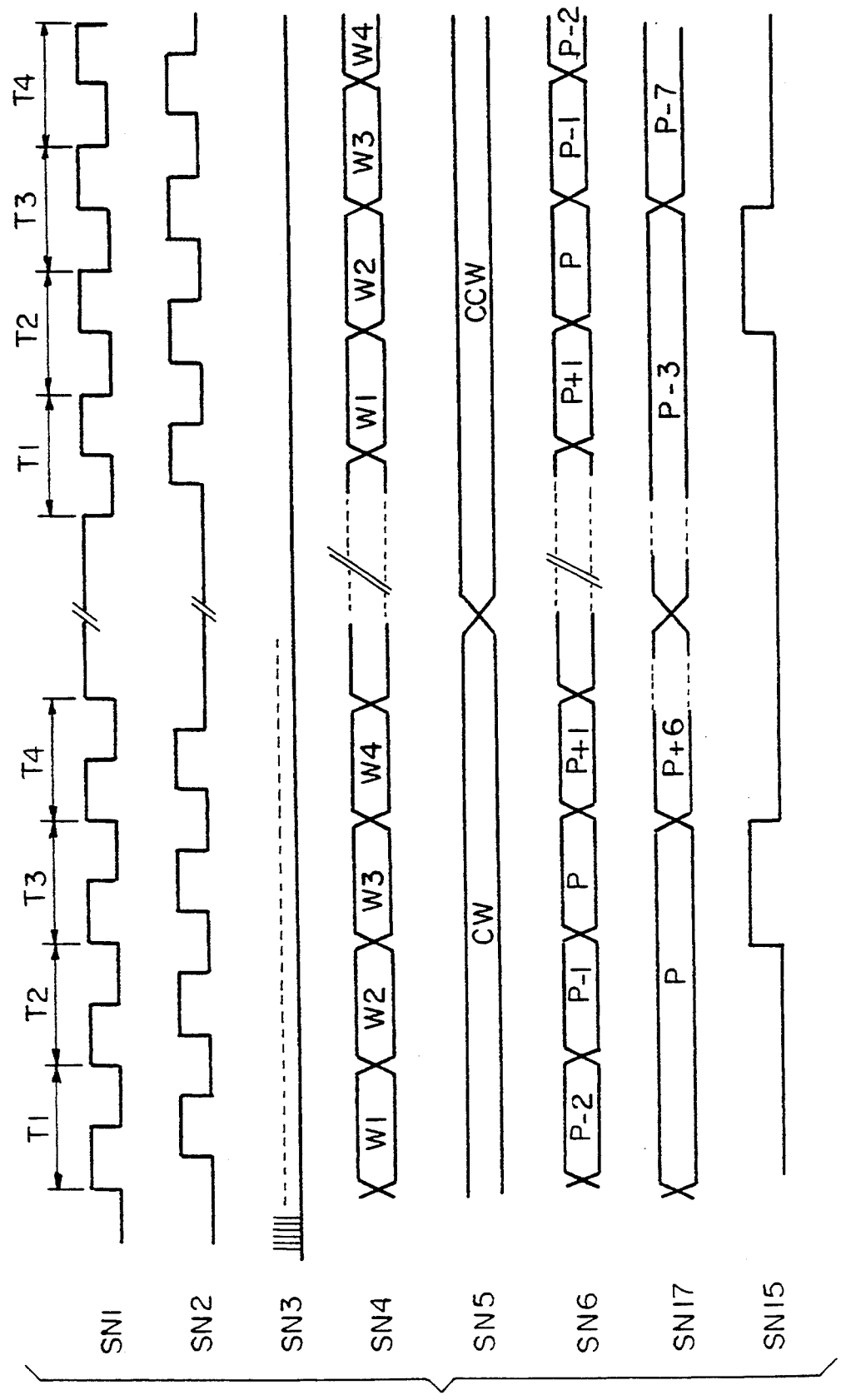
FIG. 5 is a timing chart showing operations of an angle detector, a speed detector and a control speed determination circuit of the control device shown in FIG. 3.

FIG. 5 shows an output waveform of the encoder 95 and a timing chart showing operations of the speed detector 1, the angle detector 2 and the control speed determination circuit 3.

In FIG. 5, when the motor 94 rotates clockwise (CW) direction, phase of the rotation signal SN1 from the encoder 5 advances from the signal SN2 by 90° and, when the motor rotates in counterclockwise (CCW) direction, the rotation signal SN1 delays therefrom by 90°. Each pulse of the rotation signals SN1 and SN2 generates every when the motor 94 rotates the pulley 96 by 1°. In this embodiment, the encoder 95 includes a disk plate fixedly secured to a rotary shaft of the motor 94 and two photo sensors for detecting 360 holes formed in the disk plate with an angular interval of 1°. A detection output of each photo sensor corresponds to the rotation signals SN1 and SN2. These photo sensors are arranged such that the output signals therefrom have phases different from each other by 90°.

In FIG. 6, the speed detector 1 has a counter 11 for generating the rotation speed value SN4, a latch 12, a leading edge detector 13 for detecting a leading edge of the rotation signal SN1, and a rotation direction detector 14 for generating a signal SN5 indicative of rotation direction of the motor 94 on the basis of the phase difference between the rotation signals SN1 and SN2. The counter 11 is clocked with a high speed clock signal SN3 from a clock generator 10 (FIG. 3) to count pulse durations T1, T2 and T3 (FIG. 5), etc., of the rotation signal SN1 shown in FIG. 5. The counter 11 is preset to a preset value C1 by an output of the leading edge detector 13 and down-counts the high speed clock signal SN3 until it receives a next output of the leading edge detector. Therefore, the higher the rotation speed of the motor 94 becomes, the shorter the interval between leading edges of the pulses of the rotation signal SN1 and hence the larger the output value of the counter 11. The latch 12 latches the count value (W1, W2, W3, . . . ) of the counter 11 immediately before the counter 11 is preset every rotation signal SN1. The latch 12 outputs the rotation speed value SN4.

The rotation direction detector 14 outputs a signal SN5 which is a "L" or "H" level signal dependent upon whether the rotation signal SN1 advances or delays with respect to the rotation signal SN2 by 90°.

In FIG. 7, the angle detector 12 has a phase difference detector 21 for detecting a phase difference between the rotation signals SN1 and SN2 and an up-/down counter 22 which up-counts or down-counts according to an output 210 or 220 of the phase difference detector 21. When the rotation signal SN1 advances in phase from the rotation signal SN2 by 90°, the up/down counter 22 counts up the pulses of the rotation signal SN1 according to the output 210 of the phase difference detector 21 and counts down the pulses of the rotation signal SN1 when the phase of the rotation signal SN1 delays from that of the rotation signal SN2. Therefore, the rotation angle value SN6 corresponds to a position of the carriage 92 indicated by the count value of the up/down counter 22. The rotation speed value SN4 and the rotation angle value SN6 have a timing set such that they are generated in synchronism with the rotation signal SN1.

Figure 8:
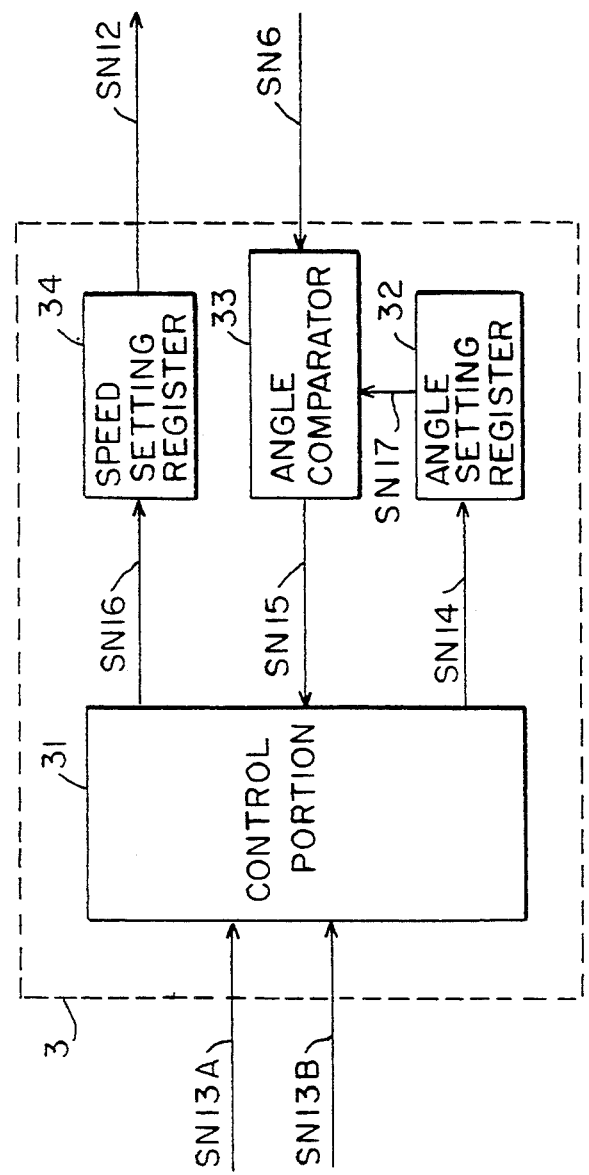
FIG. 8 is a block diagram showing the control speed determination circuit in detail.

FIG. 8 is a detailed block circuit diagram of the control speed determination circuit 3. In FIG. 8, a control portion 31 stores the aimed angle value SN13A and the aimed speed value SN13B sequentially. Further, the control portion 31 outputs an initial aimed angle value SN13A as an initial set rotation angle value SN14 and simultaneously outputs an initial aimed speed value SN13B as an initial set rotation speed value SN16. Then, when an angle coincident signal SN15 is supplied thereto, it outputs a next aimed angle value as the set rotation angle value SN14 and a next aimed speed value as the set rotation speed value SN16. An angle setting register 32 stores the set rotation angle value SN14 sequentially and outputs them as the set angle value SN17. An angle comparator portion 33 outputs the angle coincident signal SN15 when the rotation angle value SN6 coincides with the set angle value SN17. A speed setting register 34 stores the set speed value SN16 of the motor 94 sequentially and outputs them as the set speed value SN12.

Figure 9:
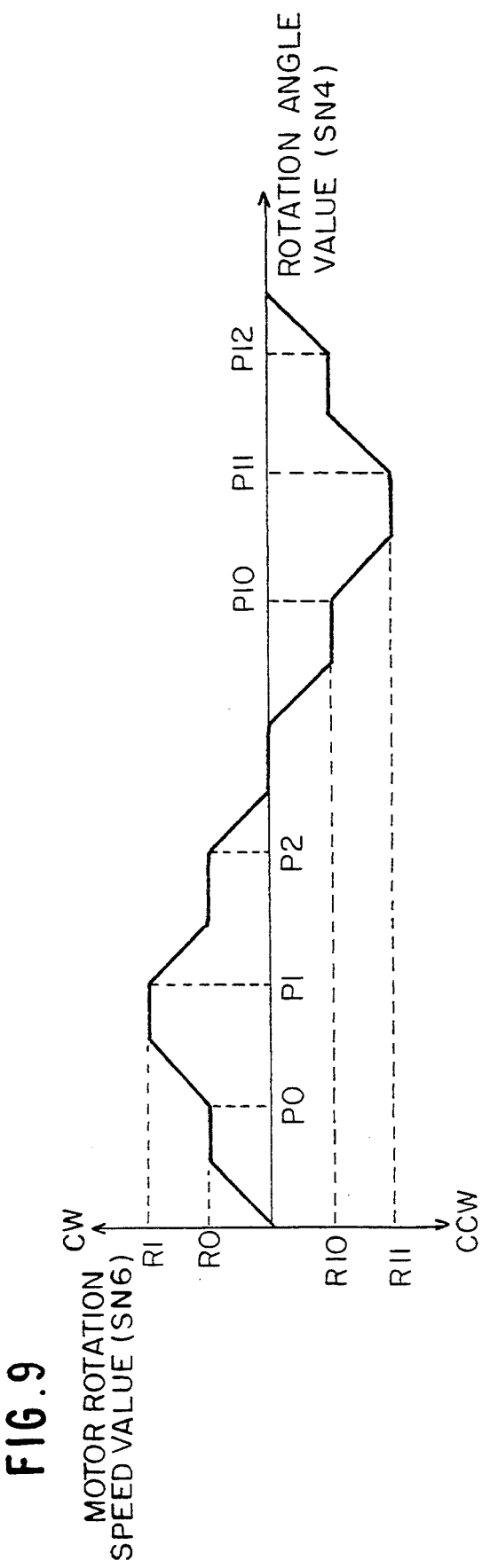
FIG. 9 is a graph showing variations of a rotation speed and rotation angle of a motor controlled by the control device shown in FIG. 3.

When the angle and speed are controlled according to the aimed values shown in FIG. 4, the control portion 31 initially sets the aimed angle value P0 in the angle setting register 12 as the set rotation angle value SN14 and at the same time sets the motor rotation speed value R0 in the speed setting register 34 as the set rotation speed value SN16. When the motor 94 starts to rotate in clockwise direction and the rotation angle of the motor 94 reaches the angle P0 and thus the rotation angle value SN6 from the angle detector 2 indicates the angle P0, the angle comparator portion 33 outputs the angle coincident signal SN15. The control portion 31 sets a next aimed angle value P1 in the angle setting register 32 as the set rotation angle value SN14 on the basis of the angle coincident signal SN15 and simultaneously sets the motor rotation speed value R1 in the speed setting register 34 as the set rotation speed value SN16. Similarly, the control portion 31 modifies the motor rotation speed to the motor rotation speed values R1 and R0 every time when the motor 94 rotates by the angles P1 and P2. FIG. 9 shows an actual operation of the motor 94.

FIG. 10 is a detailed block circuit diagram of the speed control circuit 4. In FIG. 10, the speed control circuit 4 outputs the speed control voltage value SN7 on the basis of the set speed value SN12 and the rotation speed value SN4. The speed control circuit 4 realizes function designed according to the control logic by means of a firmware. A subtracter 41 calculates a speed error el between the set speed value SN12 and the rotation speed value SN4. A speed integration amplifier 42 has a function of averaging the speed error el from an initial time point and them multiplying it with gain Ki. A state estimation circuit 43 estimates a state variables of the carriage moving mechanism 9 from the speed control value SN7 at a time instance t, that is, u(t), and the rotation speed value SN4, that is, y(t), and outputs signals S1, S2 and S3. The signals S1, S2 and S3 represent values obtained by linear transformations of the rotation speed of motor, the moving speed of carriage and a variation of change of the power transmission mechanism (change of the length of the endless belt), respectively. A state feedback circuit 46 calculates the speed control value SN7, that is, u(t), by multiplying the output signals S1, S2 and S3 with gains Kf1, Kf2 and Kf3, respectively, summing the products and adding an output of the speed integration amplifier 42 to the sum. An output of an operator 45 of the state feedback circuit 46 has a negative value and an adder 44 substantially functions as a subtracter.

As an example of the method of determining the gain Ki of the speed integration amplifier 42 and the respective gains Kf1, Kf2 and Kf3 of the state feedback circuit 46, the method based on the optimal regulator will be described. Since the carriage moving mechanism 9 shown in FIG. 3 is an electric-mechanical composite system, its characteristic equation is described by an equation of motion and an equation of voltage and represented by the following equation:

$$\frac{dx(t)}{dt} = A \cdot x(t) + B \cdot u(t) \quad (1)$$

$$y(t) = C \cdot x(t)$$

where
u(t) : speed control value
x(t) : state variables of an interior of the carriage moving mechanism
y(t) : rotation speed value.

In the system represented by the equation (1), a control system for making the set speed value SN12, that is, r, followed by the rotation speed value SN4, that is, y(t) is assumed. In a process for detecting the rotation speed value y(t) every constant time interval T of the control system, the equation (1) is transformed to the following differential equation:

$$x(k+T) = Ad \cdot x(k) + Bd \cdot u(k)$$

$$y(k) = Cd \cdot x(k) \quad (2)$$

where $$k = 0, T, 2T, 3T \ldots$$

$$Ad = \exp(AT); \quad Bd =$$

$$Bd = \int_0^T \exp Bdt^{At};$$

$$Cd = C$$

A discrete system model of the equation (2) is variable transformed by the following equation (3), resulting in the following equation (4) which is referred to as a enlarged system model:

$$\epsilon(k) = r - y(k) \quad (3)$$
$$\xi(k) = x(k+T) - x(k)$$
$$\eta(k) = u(k+T) - u(k)$$

$$\begin{bmatrix} \xi(k+T) \\ \epsilon(k+T) \end{bmatrix} = \begin{bmatrix} Ad & 0 \\ -Cd & 1 \end{bmatrix} \begin{bmatrix} \xi(k) \\ \epsilon(k) \end{bmatrix} + \begin{bmatrix} Bd \\ 0 \end{bmatrix} \eta(k) \quad (4)$$

$$\epsilon(k) = \begin{bmatrix} 0 & 1 \end{bmatrix} \begin{bmatrix} \xi(k) \\ \epsilon(k) \end{bmatrix}$$

The following permutation is performed for the equation (4).

$$x(k) = \begin{bmatrix} \xi(k) \\ \epsilon(k) \end{bmatrix}; \quad y(k) = \epsilon(k); \quad u(k) = \eta(k) \quad (5)$$

$$A = \begin{bmatrix} Ad & 0 \\ -Cd & 1 \end{bmatrix}; B = \begin{bmatrix} Bd \\ 0 \end{bmatrix}; C = [0 \ 1]$$

Suitable positive symmetrical matrices (matrices whose scalar amount x'Px with respect to an arbitrary vector x becomes x'Px>0, P=P') Q and R are selected for the equations (4) and (5) and an evaluation function J is defined by the following equation (6), and k with which J becomes minimum is obtained.

$$J = \sum_{k=0}^{\infty} \{X'(k)c''QCx(k) + u'(k)Ru(k)\} \quad (6)$$

$$u(k) = Kx(k)$$

It is known that a solution of the equation (6) is given by Ricatti equation represented by the following equation (7).

$$0 = P - A'PA + A'PB(R + B'PB)^{-1} B'PA - C'QC$$

$$K = -(R + B'PB)^{-1} B'PA \quad (7)$$

The equation (1) is assumed as a three degree differential equation, K becomes a 4×1 matrix represented by the equation (8).

$$K = [Kf1 \ Kf2 \ Kf3 \ ki] \quad (8)$$

From the equation (8), the gains Ki, Kf1, Kf2 and Kf3 of the speed integration amplifier 42 and the state feedback circuit 46 are obtained.

By changing the values of Q and R given by the equation (6), respective factors Ki, Kf1, Kr2 and Kf3 of K of the equation (8) change and thus it is possible to regulate activation characteristics of the motor and the carriage speed.

Figure 11:
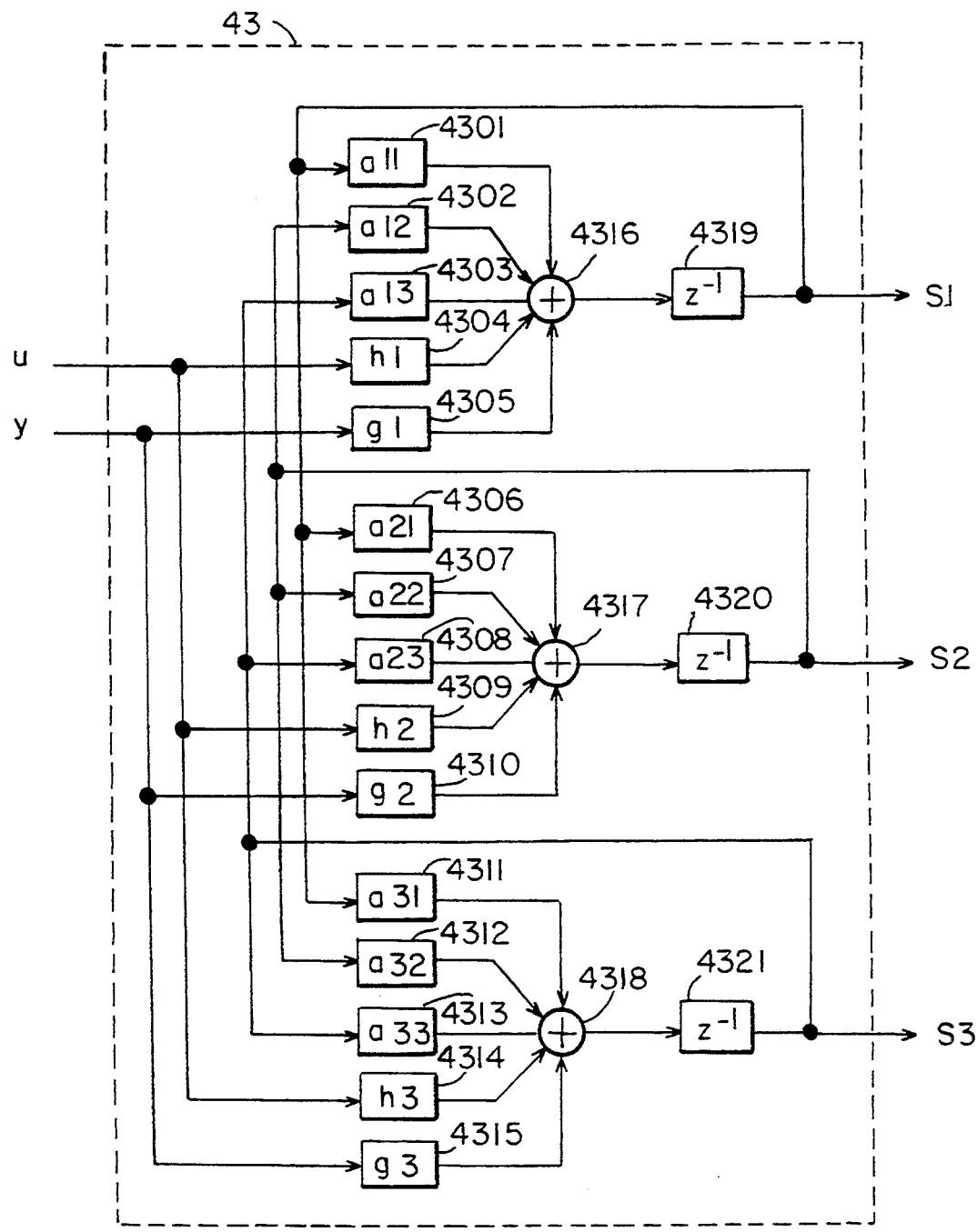
FIG. 11 is a circuit diagram of a state estimation circuit of the speed control circuit shown in FIG. 10.

FIG. 11 is a block diagram showing an example of the state estimation circuit 43. In FIG. 11, the state estimation circuit 43 calculates estimation amount Si(N+1) (i=1, 2, 3, ... ) of the rotation speed of motor, the carriage speed and the variation amount of power transmission mechanism at a time instance n+1 from speed control value u(n), rotation speed value y(n) and estimation amount Si(n) (i=1, 2, 3, ... ) of the rotation speed of motor, the carriage speed and the variation amount of power transmission mechanism at a time instance n, which are stored in three respective delay circuitries 4319, 4320 and 4321. Further, the state estimation circuit 43 includes adders 4316, 4317 and 4318 for summing outputs of multipliers 4301–4305, 4306–4310 and 4311–4315, respectively, in addition to the delay devices 4319, 4320 and 4321 for temporarily storing the outputs of the adders 4316, 4317 and 4318, respectively. The multipliers 4301, 4306 and 4311 output products of the output of the delay device 4319 and respective coefficients a11, a21 and a31. Similarly, the multipliers 4302, 4307 and 4312 output products of the output of the delay device 4320 and respective coefficients a12, a22 and a32 and the multipliers 4303, 4308 and 4313 output products of the output of the delay device 4321 and respective coefficients a13, a23 and a33. Further, the multipliers 4304, 4309 and 4314 output the products of the speed control value u(n) and respective coefficients h1, h2 and h3 and the multipliers 4305, 4310 and 4315 loutput the products of the rotation speed value y(n) and respective coefficients g1, g2 and g3.

As an example of the method of determining the coefficients aij, hi and gi (i, j=1, 2, 3, ... ) of the respective multipliers 4301–4305, 4306–4310 and 4311–4315 of the state estimation circuit 43, an observer algorithm referred to as Kalman filter will be described.

With respect to the discrete system model shown by the equation (2), a model which takes an internal noise w(k) of the model and a detected noise v(k) into consideration is represented by the following equation:

$$x(k+1) = Ad \cdot x(k) + Bd \cdot u(k) + N \cdot w(k)$$

$$y(k) = Cd \cdot x(k) + v(k) \quad (9)$$

where $$E[w(k)] = E[v(k)] = 0$$

$$E[w(k) \cdot w'(k)] = Q$$

$$E[v(k) \cdot v'(k)] = R$$

$$E[v(n) \cdot v'(n)] = 0 \quad (10)$$

E [ ] is a mean time represented by the following equation:

$$E[x(k)] = \frac{1}{N} \sum_{k=0}^{N} x(k) \quad (11)$$

It is assumed that variables z(k) estimating state variables x(k) is represented by the following equation:

$$Z(k+1) = F \cdot z(k) + L \cdot u(k) + G \cdot g(k) \quad (12)$$

where $$F = A - GC; L = B.$$

An estimation condition shown by the following equation is given between the state amount x(k) and the estimation amount z(k)

$$E[|x(k) - z(k)|^2] \rightarrow 0 \ (k \rightarrow \infty) \quad (13)$$

G satisfies the equations (12) and (13) is given as a solution of Ricatti equation shown by the following equation.

$$0 = P - APA' + APC'(R + CPC')^{-1} CPA' - NQN'$$

$$G = APC'(R + CPC')^{-1} \quad (14)$$

F, L and G are represented by respective factors as follow and the respective coefficients aij, hi and gi (i, j=1, 2, 3, ... ) of the multipliers 4301–4305, 4306–4310 and 4311–4315 of the state estimation circuit are obtained from the equation (15):

$$F = \begin{bmatrix} a11 & a12 & a13 \\ a21 & a22 & a23 \\ a31 & a32 & a33 \end{bmatrix} L = \begin{bmatrix} h1 \\ h2 \\ h3 \end{bmatrix} G = \begin{bmatrix} g1 \\ g2 \\ g3 \end{bmatrix} \quad (15)$$

Figure 12:
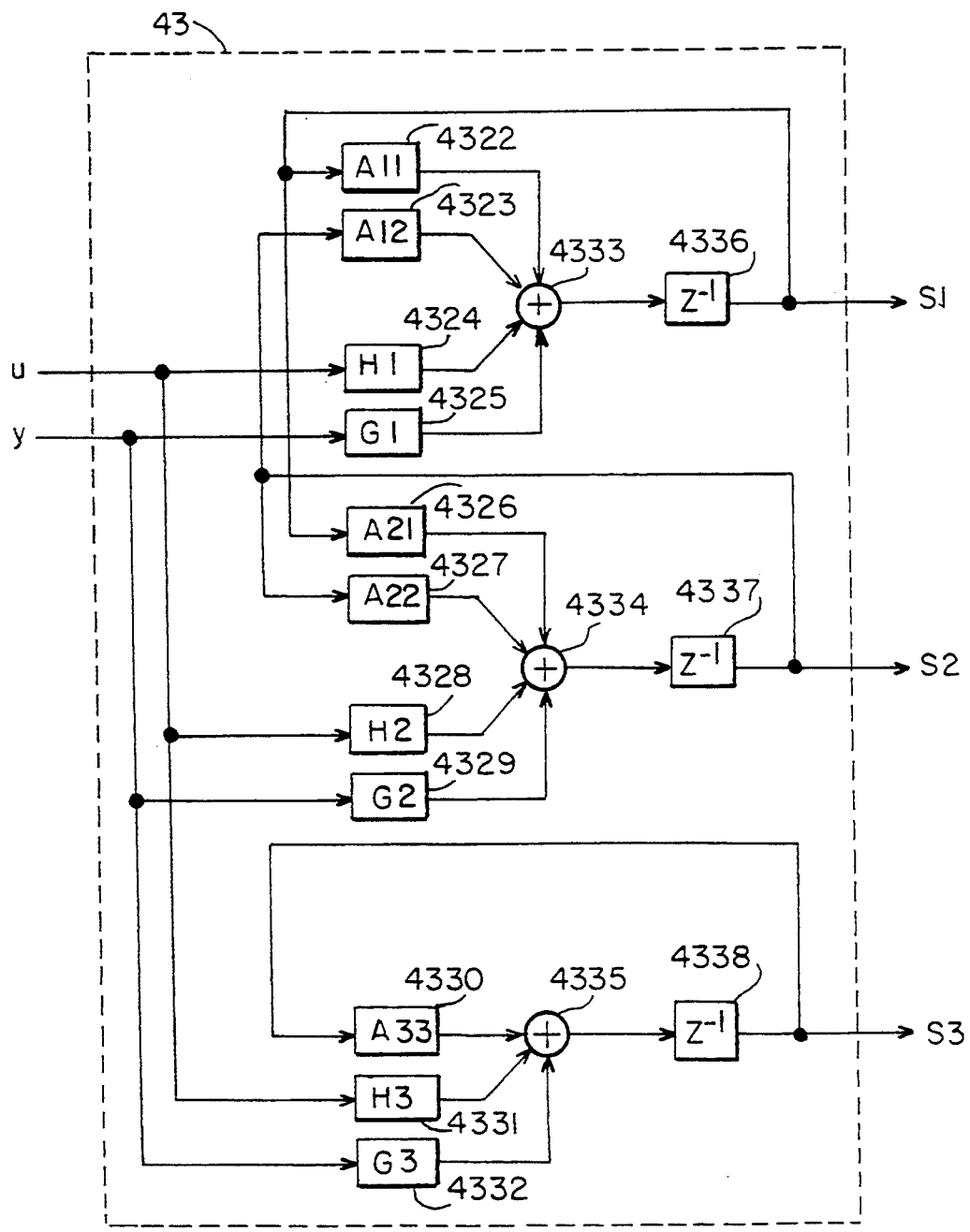
FIG. 12 is a circuit diagram of another state estimation circuit of the speed control circuit shown in FIG. 10.

FIG. 12 shows another example of the state estimation circuit 43. In FIG. 12, the state estimation circuit 43 has a similar construction to that shown in FIG. 11.

However, the coefficients aij, hi and gi (i,j = 1, 2, 3, ...) of the respective multipliers 4301–4305 shown in FIG. 11 can eliminate the coefficients a13, a23, a31 and a32 of the multipliers 4303, 4308, 4311 and 4312 by obtaining the optimal value by means of the observer alogrithm called Kalman filter in control logic. That is, the state estimation circuit 43 in FIG. 12 includes adders 4333, 4334 and 4335 for summing outputs of the respective multipliers 4322–4325, 4326–4329 and 4330–4332, and delay devices 4336, 4337 and 4338 for temporarily storing outputs of the respective adders 4333, 4334 and 4335. The multipliers 4322 and 4326 output products of the output of the delay device 4336 and coefficients A11 and A21, respectively. Similarly, the multipliers 4323 and 4327 output products of the output of the delay device 4337 and coefficients A12 and A22, respectively, and the multiplier 4330 outputs a product of the output of the delay device 4338 and a coefficient A33. The multipliers 4324, 4328 and 4331 output products of the speed control value u(n) and respective coefficients H1, H2 and H3 and the multipliers 4325, 4329 and 4332 output products of a speed information y(t) and respective coefficients G1, G2 and G3. The number of multiplications and the number of summations in the state estimation circuit 43 shown in FIG. 12 are smaller compared with the state estimation circuit 43 shown in FIG. 11.

As mentioned above, the state estimation circuit 43 of the speed control circuit 4 linearly transforms the rotation speed of motor, the moving speed of carriage and the variation of change of power transmission mechanism into speed control values, respectively, and outputs the signals S1, S2 and S3. Signals obtained by multiplying these signals S1, S2 and S3 with the respective coefficients Kf1, Kf2 and Kf3 obtained from the state equations are added to an output of the integration amplifier 42. On the other hand, the integration amplifier 42 integrates the speed error signal el sequentially and holds it for a constant time. When the error signal el becomes 0, the output of the integrator 42 disappears. At this time, the variation of the output of the adder 44 is also disappeared, resulting in a constant output. Further, when the rotation speed value SN4 approaches 0, the speed control value SN7 which is a sum of the outputs of the integration amplifier 42 and the operator 45 approaches 0.

FIG. 13 is a detailed circuit diagram of the angle control circuit 5. In FIG. 13, a subtracter 51 calculates an angle error e2 between the aimed angle value SN13 and the rotation angle value SN6. An adder 56 sums a value obtained by averaging the angle error e2 from an initial time point and multiplying a value resulting from the integration with a predetermined first coefficient value, a value obtained by multiplying the rotation angle value SN6 with a predetermined second coefficient value, and a value obtained by multiplying the rotation speed value SN4 with a predetermined third coefficient value, and outputs the sum as the angle control value SNS. An angle error integrator 52 integrates or averages the angle error e2 from the initial time point and multipliers 53, 54 and 55 multiply input signals thereof with predetermined first, second and third coefficients.

The second and third coefficients of the multipliers 54 and 55 have negative values and determine magnitudes of the control amount during the angle control. That is, although when absolute values of the second and third coefficients are large, convergence to the aimed angle value becomes fast though it is unstable. On the contrary, with small absolute values of these coefficients, a stable rotation angle control is possible though convergence time becomes longer. When the rotation angle value SN6 becomes equal to the aimed angle value SN13, a sum of the output of the multipliers 53 and 54 become 0. When, at the same time, the rotation speed value SN4 becomes also 0, the angle control value SN8 becomes 0.

Figure 14:
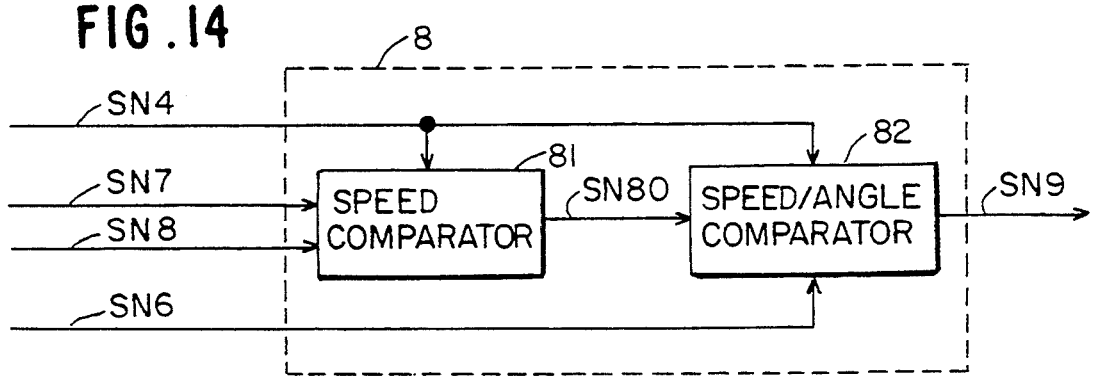
FIG. 14 is a block diagram showing a speed and angle comparator of the control device shown in FIG. 3 in detail.

FIG. 14 is a detailed block circuit diagram of the speed and angle comparator 8. In FIG. 14, a speed comparator 81 outputs the speed control value SN7 as a control drive value SN80 until the rotation speed value SN4 becomes within a first predetermined speed range $\varepsilon s$ and outputs the angle control value SN8 as the control drive value SN80 when it becomes within the first speed range $\varepsilon s$. A speed/angle comparator 82 stops to provide the control drive value SN80 as the motor drive control value SN9 when the rotation speed value SN4 and the rotation angle value SN6 are within a second predetermined speed range $\varepsilon v$ narrower than the first predetermined speed range and within a predetermined angle range $\varepsilon x$, respectively, and, otherwise, outputs the control drive value SN80 as the motor drive control value SN9.

Figure 15:
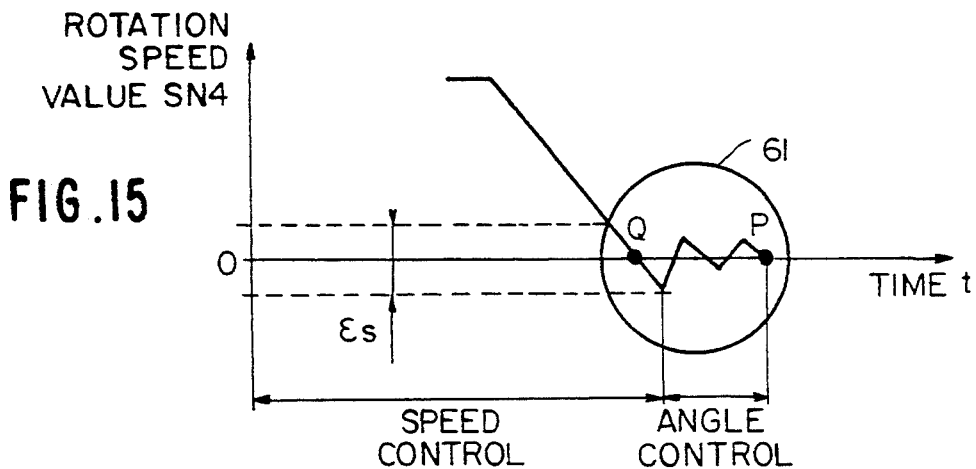
FIGS. 15 and 16 are graphs illustrating an operation of the speed and angle comparator of the control device shown in FIG. 3, respectively.
Figure 16:
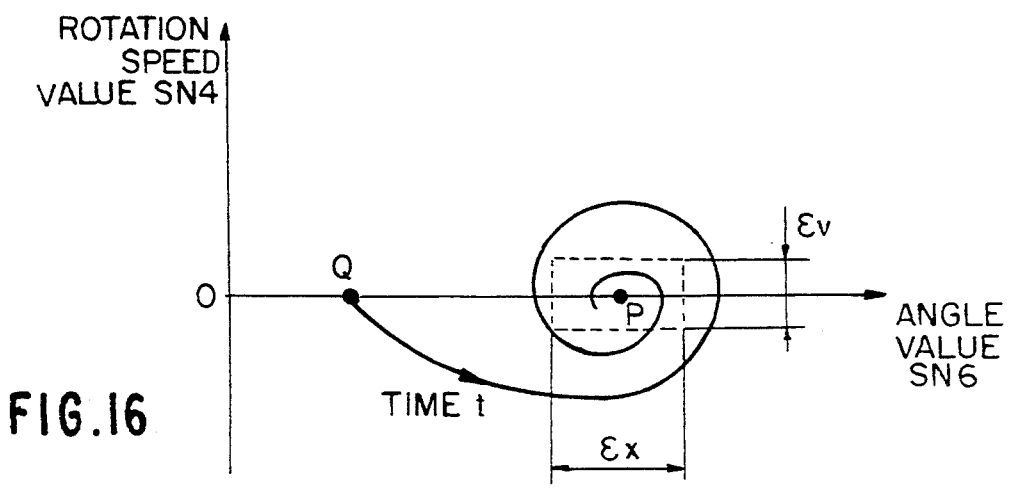

FIG. 15 shows a relation between the rotation speed value SN4 and time and, FIG. 16 shows a relation between the rotation speed value SN4 and the rotation angle value SN6. The angle control circuit 5 and the speed and angle comparator 8 will be described in detail with reference to FIGS. 13 to 16. Since the speed control circuit 4 does not use the rotation angle value SN6, it is difficult to stop the motor 94 at an aimed stop angle exactly. When the speed and angle comparator 8 detects a speed of the motor 94, which is within a stop threshold value $\varepsilon s$, an angle control system for stopping the motor 94 at the aimed stop angle PY is constructed by utilizing an output of the angle control circuit 5. The speed and angle comparator 8 outputs the speed control value SN7 until the rotation speed value SN4 becomes within the predetermined speed range $\varepsilon s$ and outputs the angle control value SN8 when it becomes within the predetermined speed range $\varepsilon s$, as shown in FIG. 15, and finally, stops the control drive value SN80 when the rotation speed value SN4 and the rotation angle value SN6 are within a predetermined speed range $\varepsilon v$ narrower than the predetermined speed range $\varepsilon s$ and within a predetermined angle range $\varepsilon x$, respectively, as shown in FIG. 16. With this operation, the angle and speed of the motor 94 gradually become within the ranges of the threshold values $\varepsilon x$ and $\varepsilon v$, respectively, and the angle and speed of the motor 94 converge to the aimed stop angle and 0, respectively. At this time, the comparator 82 produces a control end flag.

Figure 17:
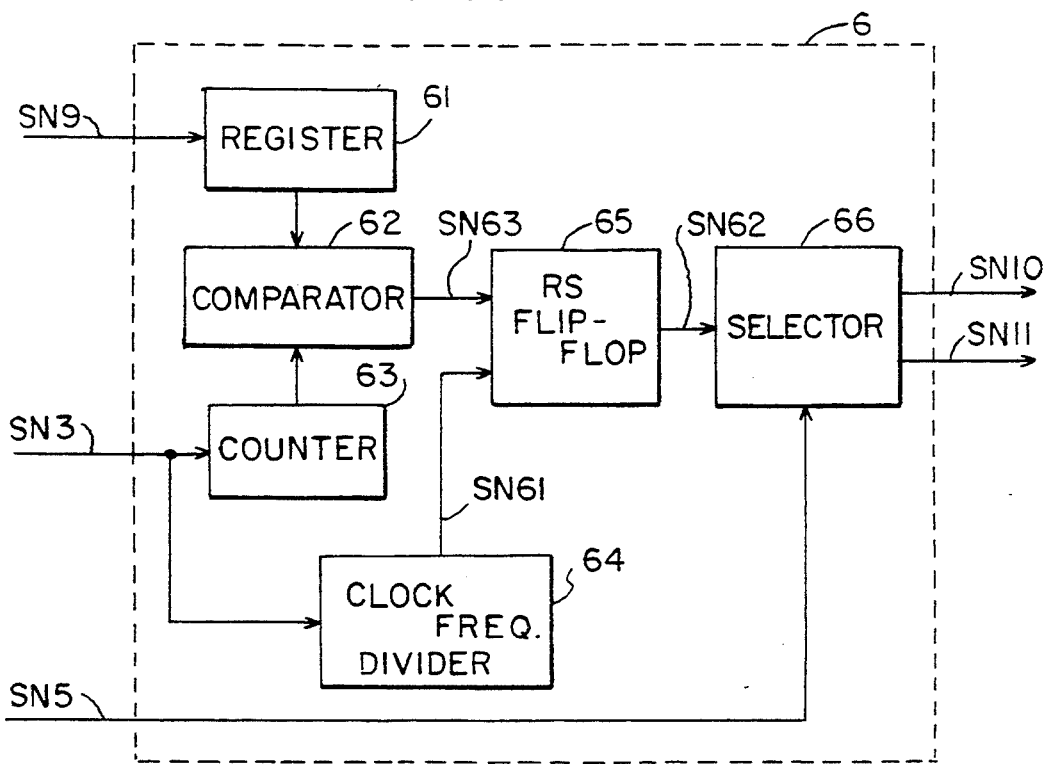
FIG. 17 is a block diagram showing a pulse width modulator circuit of the control device shown in FIG. 3 in detail.
Figure 18:
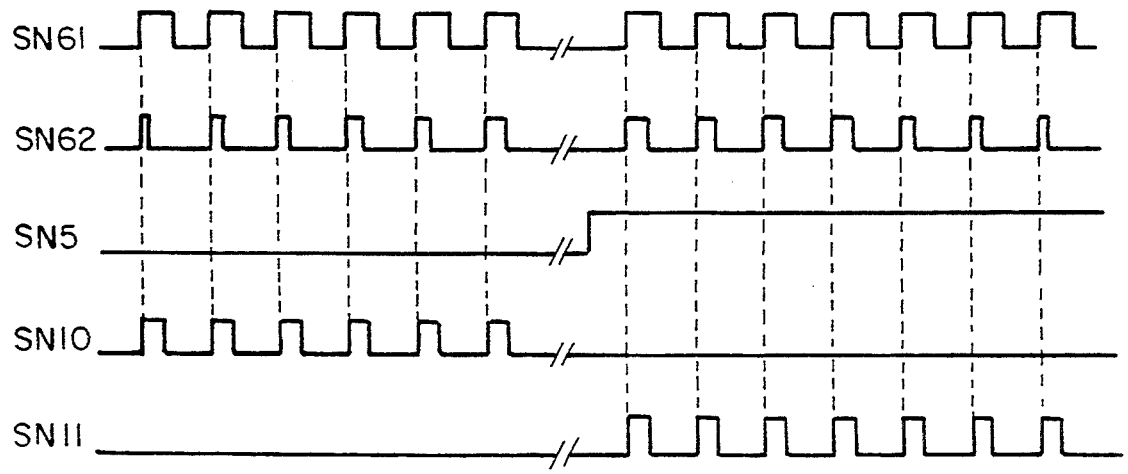
FIG. 18 shows operational waveforms of the pulse width modulator circuit shown in FIG. 17.

FIG. 17 is a detailed block circuit diagram of the pulse width modulation circuit 6 and FIG. 18 shows waveforms indicating an operation of the pulse width modulation circuit. In these FIGURES, a register 61 stores the motor drive control value SN9. A high speed clock counter 63 counts high speed clocks SN3. A comparator 62 compares an output of the register 61 with an output of the high speed clock counter 63 and, when the output of the clock counter 63 becomes equal to that of the register 61, outputs a coincidence signal SN63. On the other hand, a high speed clock frequency divider 64 frequency-divides the high speed clock SN3 and outputs a clock frequency dividing signal SN61. A period of the frequency dividing signal SN61 is a period of the drive pulse of the motor 94. A RS flip-flop 65 is set and reset by the clock frequency dividing signal SN61 and the coincidence signal SN63, respectively, and outputs a motor drive pulse SN62. Therefore, pulse width of the motor drive pulse SN62 changes correspondingly to an output value of the register 61. A selector 66 selectively outputs the motor drive pulse SN62 as a forward motor drive pulse SN10 or a reverse motor drive pulse SN11, on the basis of a signal SN5 from the speed detecting portion 1 which indicates a direction of rotation. In this embodiment, the forward rotation of the motor is clockwise rotation and the reverse rotation is counterclockwise rotation. Since the direction indicating signal SN15 is not produced at a initial time when the motor 94 is started, the selector 66 forcibly determines the direction of rotation at the start time according to an output (not shown) of the aimed value generator portion 100 (FIG. 3).

Figure 19:
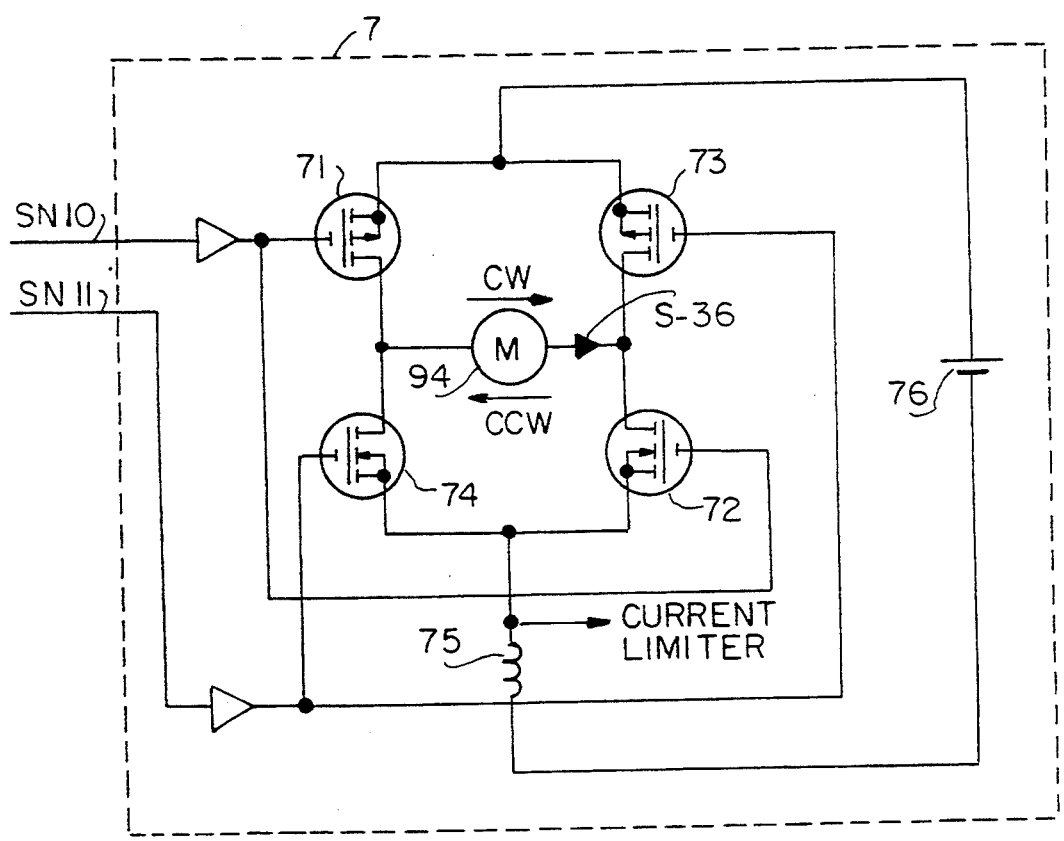
FIG. 19 is a circuit diagram of a power amplifier of the control device shown in FIG. 3.

FIG. 19 is a detailed block circuit diagram of the power amplifier 7. In FIG. 19, the power amplifier 7 includes bridge-connected four transistors 71–74. One end of the bridge is connected to a power source 76 and the other end is connected to the motor 94. The transistors 71 and 72 are turned ON in response to a forward motor drive pulse SN10 to supply a current from the power source 76 with which the motor 94 is rotated in clockwise (CW) direction. On the other hand, when the reverse motor drive pulse SN11 is supplied thereto, the transistors 73 and 74 are turned ON to supply a current from the power source 74 with which the motor 94 is rotated in counter-clockwise (CCW) direction.

Now, an alarm generating mechanism will be described. In the control device for controlling carriage movement according to the present invention, many delay elements, that is, registers, are used. Therefore, a normal control may become impossible when overflow occurs dependent upon result of addition, subtraction and/or multiplication. In order to treat this problem, the servo control is forcibly stopped at a time when such overflow occurs or at a time at which it is determined that a motor drive voltage becomes abnormal with respect to the source voltage so that electrical and/or mechanical damage of the system is prevented. Further, the present device has a function of generating an alarm when a normal control of speed and position can not be done due to damage of circuit and/or damage of wiring in the device. Although concrete circuits for realizing such functions are not shown, it may be enough to say that it is monitored whether outputs of adders and/or multipliers used in the respective circuits are overflown and the servo control is stopped if overflow occurred.

Figure 20:
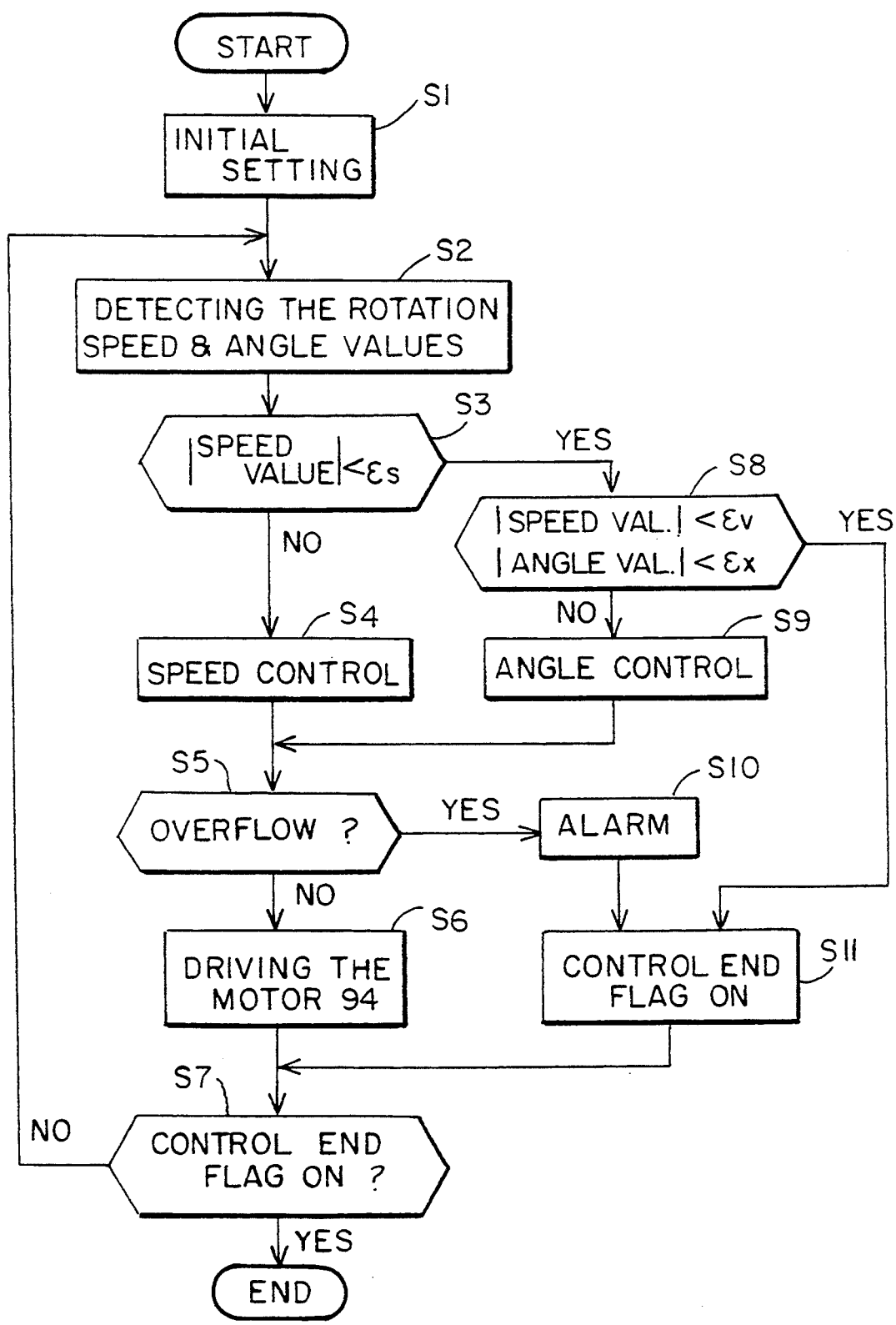
FIG. 20 is a flow chart showing an operation of the control device shown in FIG. 3.

FIG. 20 is a flowchart showing an operation of the control device for controlling movement of the carriage having the printing head shown in FIG. 3. In an initial setting, all registers and counters to be used for control are cleared and then set with various constants (S1). Then, the speed detector 1 and the angle detector 2 detect rotation speed and rotation angle of the motor 94 and calculate their values (S2). If the speed of the motor 94 calculated in the step S2 is out of the predetermined speed range $\varepsilon$s (S3), the speed and angle comparator 8 executes the speed control by means of the speed control circuit 4 (S4). If there is no overflow during the speed control (S5), the speed and angle comparator 8 produces the motor drive control value SN9 to drive the motor 94 (S6) and executes the step S2 again since there is no control end flag. When the speed of the motor 94 which is calculated in the step S2 becomes within the predetermined speed range $\varepsilon$s but still out of the predetermined speed range $\varepsilon$v or when the angle of the motor 94 which is calculated in the step S2 is out of the predetermined angle range $\varepsilon$x (S8), the angle control is executed by means of the angle control circuit 5 (S9). If there is no overflow during this angle control (S5), the speed and angle comparator 8 produces the motor drive control value SN9 to drive the motor 94 (S6) and executes the step S2 again because there is no control end flag. When the speed of the motor 94 which is calculated in the step S2 is within the predetermined speed range $\varepsilon$s and further within the predetermined speed range $\varepsilon$v and the angle of the motor 94 which is calculated in the step S2 is within the predetermined angle range $\varepsilon$x (S8), the control end flag is produced (S11) and the control is terminated (S7). If there is overflow during the speed control and the angle control (S5), the alarm process is performed (S10), the control end flag is produced (S11) and the control is terminated (S7).

As described hereinbefore, according to the present invention, a high speed and error-free control device for controlling movement of a printing head carriage is obtained by detecting rotation speed value, rotation angle value and direction of rotation of a motor of a carriage moving mechanism in which the motor is connected to a printing head carriage through a power transmission mechanism, generating a speed control value so that the rotation speed value is made closer to a set speed value, generating an angle control value by means the rotation angle value so that the latter is made closer to an aimed angle value, outputting the speed control value or the angle control value as a motor drive control value or stopping such output dependent upon whether or not the rotation speed value and the rotation angle value are within a predetermined speed range and a predetermined angle range, respectively, producing a forward or reverse motor drive signal on the basis of the motor drive control value and the direction of rotation and supplying a motor drive power to the motor according to the forward or reverse motor drive pulse.

It should be noted that the present invention is not limited to the described embodiments and can be modified in various manners. For example, although the pulse width modulation circuit 6 generates the motor drive pulse by pulse width modulation on the basis of the motor drive control value SN9 from the speed and angle comparator 8, it is possible to use a pulse frequency modulation circuit instead of the pulse width modulation circuit.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A control device for controlling movement of a carriage having a printing head, said movement performed by a driving motor by means of a motor drive signal while controlling the motor drive signal, said control device comprising:

a speed detector which detects a rotation speed of said motor and generates a rotation speed value indicative of the rotation speed of said motor and a signal indicative of a direction of rotation of said motor;

an angle detector which detects a rotation angle of said motor and generates a rotation angle value indicative of the rotation angle of said motor from an initial position;

a set speed determination circuit for determining a set speed value to be set on the basis of an aimed angle value indicative of an aimed rotation angle, an aimed speed value indicative of an aimed rotation speed and said rotation angle value;

a speed control circuit which generates a speed control value for making said rotation speed value closer to said set speed value on the basis of a difference value between said rotation speed value and said set speed value;

an angle control circuit which generates an angle control value for making said rotation angle value closer to said aimed angle value on the basis of a difference between said aimed angle value and said rotation angle value;

a selection circuit which selects said speed control value as a motor drive control value for closed loop speed control when said rotation speed value is larger than a first speed value, and selects said angle control value as the motor drive control value for closed loop angle control when said rotation speed value is smaller than said first speed value; and a drive signal generator which generates a motor drive signal modulated according to a magnitude of said motor drive control value and outputs said motor drive signal as a forward motor drive signal or a reverse motor drive signal on the basis of said signal indicative of the direction of rotation.

2. The control device claimed in claim 1, further comprising means for generating said aimed angle value and said aimed speed value on the basis of a moving distance information of said carriage.

3. The control device in claim 1 wherein said set speed determination circuit comprises a coincidence determination circuit for determining whether or not said rotation angle equals said aimed angle value, and a circuit which outputs a next aimed speed value as a set speed value and supplies another aimed angle value to said coincidence determination circuit when said rotation angle value equals said aimed angle value.

4. The control device claimed in claim 1, wherein said speed control circuit comprises a subtracter for calculating a speed error between said set speed value and said rotation speed value, an averaging circuit for averaging said speed error from an initial time point, a state estimation circuit for estimating a speed of said carriage and state variables of said power transmission mechanism due to said motor on the basis of said speed control value and said rotation speed value, and a state feedback circuit for outputting a multiplied signal by multiplying estimated values of said rotation speed value, said carriage speed and said state variables with respective gains, and adding an output of said averaging circuit to said multiplied signal to generate said speed control value.

5. The control device claimed in claim 4, wherein said state estimation circuit outputs said estimated values of said rotation speed value, said carriage speed and said state variables at a certain time instance on the basis of a sum of products of said rotation speed value, said carriage speed and said state variables at a preceding time instance and respective coefficients.

6. The control device claimed in claim 1, wherein said angle control circuit comprises a subtracter for calculating an angle error between said aimed angle value and said rotation angle value and, an adder for summing a value obtained by averaging said angle error from an initial time point and multiplying an averaged angle error with a first coefficient, a value obtained by multiplying said rotation angle value with a second coefficient and a value obtained by multiplying said rotation speed value with a third coefficient and, outputting a resultant sum as said angle control value.

7. The control device claimed in claim 1, wherein said selection circuit comprises a first selection circuit for outputting said speed control value as a control drive value when said rotation speed value is larger than said first speed value and outputting said angle control value as the control drive value when said rotation speed value is smaller than said first speed value and, a second selection circuit for stopping an output of said control drive value as said motor drive control value when said rotation speed value and said rotation angle value are lower than a second speed value smaller than said first speed value and smaller than a predetermined angle value, respectively, and, otherwise, outputting said control drive value as said motor drive control value.

8. The control device claimed in claim 1, wherein said drive signal generator comprises a register for storing said motor drive control value, a high speed clock counter for counting high speed clock, a drive voltage comparator for comparing an output of said register with an output of said high speed clock counter and outputting a coincidence signal, a high speed clock frequency divider for frequency dividing said high speed clock and outputting a frequency-divided high speed clock signal, a RS flip-flop having said frequency-divided high speed clock signal and said drive voltage coincidence signal as a set and reset signals and outputting said motor drive signal and, a selector for selectively outputting said motor drive signal as said forward motor drive signal and as said reverse motor drive signal according to said signal indicative of the direction of rotation.

9. The control device claimed in claim 1, wherein said rotation speed value, said signal indicative of the direction of rotation and said aimed angle value are generated according to a rotation signal from respective encoders fixed to a rotary shaft of said motor.

10. The control device claimed in claim 1 wherein said speed control circuit further generates a state signal by estimating state variables of a power transmission mechanism of said motor and said carriage on the basis of said rotation speed value during closed loop control, and adds said state signal to said difference value to generate a speed control value for making said rotation speed value closer to said set speed value.

11. A control device for controlling movement of a carriage having a printing head, said movement performed by a driving motor by means of a motor drive signal while controlling the motor signal, said control device comprising:

speed detection means for generating a rotation speed value indicative of the rotation speed of said motor;

angle detection means for generating a rotation angle value indicative of the rotation angle of said motor from an initial position;

speed determination means for determining a set speed value to be set on the basis of an aimed angle value indicative of an aimed rotation angle, an aimed speed value indicative of an aimed rotation speed and said rotation angle value;

speed control means for generating a speed control value for making said rotation speed value closer to said set speed value on the basis of a difference value between said rotation speed value and said set speed value;

angle control means for generating an angle control value for making said rotation angle value closer to said aimed angle value on the basis of a difference between said aimed angle value and said rotation angle value;

selection means for selecting said speed control value as a motor drive control value for closed loop speed control when said rotation speed value is larger than a first speed value and selecting said angle control value as the motor drive control value for closed loop angle control when said rotation speed value is smaller than said first speed value; and drive signal generation means for generating a motor drive signal modulated according to a magnitude of said motor drive control value and for outputting said motor drive signal.

12. The control device claimed in claim 11, further comprising means for generating said aimed angle value and said aimed speed value on the basis of a moving distance information of said carriage.

13. The control device of claim 11 wherein said speed determination means further includes means for receiving an aimed angle value indicative of an aimed rotation angle and an aimed speed value indicative of an aimed rotation speed, and further comprises a coincidence determination means for determining whether or not said rotation angle value is equal to said aimed angle value, and means for outputting a next aimed speed value as a set speed value and supplies another aimed angle value to said coincidence determination means when said rotation angle value equals said aimed angle value.

14. The control device claimed in claim 11 wherein said speed control means further includes means for generating a state signal by estimating state variables of a power transmission mechanism of said motor and said carriage on the basis of said rotation speed value during closed loop control, and adding said state signal to said difference value to generate a speed control value for making said rotation speed value closer to said set speed value.

15. A control method for controlling movement of a carriage having a printing head, said movement performed by a driving motor by means of a motor drive signal while controlling the motor drive signal, said control method comprising the steps of:

detecting a rotation speed of said motor and generating a rotation speed value indicative of the rotation speed of said motor and a signal indicative of a direction of rotation of said motor;

detecting a rotation angle of said motor and generating a rotation angle value indicative of the rotation angle of said motor from an initial position;

determining a set speed value to be set on the basis of an aimed angle value indicative of an aimed rotation angle, an aimed speed value indicative of an aimed rotation speed and said rotation angle value;

generating a speed control value for making said rotation speed value closer to said set speed value by detecting a difference value between said rotation speed value and said set speed value;

generating an angle control value for making said rotation angle value closer to said aimed angle value on the basis of a difference between said aimed angle value and said rotation angle value;

selecting said speed control value as a motor drive control value for closed loop speed control when said rotation speed value is larger than a first speed value and selecting said angle control value as the motor drive control value for closed loop angle control when said rotation speed value is smaller than said first speed value; and generating a motor drive signal modulated according to a magnitude of said motor drive control value and outputting said motor drive signal as a forward motor drive signal or a reverse motor drive signal on the basis of said signal indicative of the direction of rotation.

16. The control method claimed in claim 15, further comprising a step of generating said aimed angle value and said aimed speed value on the basis of a moving distance information of said carriage.

17. The control method claimed in claim 15, wherein said step of determining said set speed value comprises the steps of receiving an aimed angle value indicative of an aimed rotation angle and an aimed speed value indicative of an aimed rotation speed, determining whether or not said rotation angle value equals said aimed angle value, and outputting next aimed speed value as a set speed value when said rotation angle value equals said aimed angle value.

18. The control method claimed in claim 15, wherein said step of generating said speed control value comprises the steps of calculating a speed error between said set speed value and said rotation speed value, averaging said speed error from an initial time point, estimating a speed of said carriage and state variables of said power transmission mechanism due to said motor on the basis of said speed control value and said rotation speed value, outputting a multiplied signal by multiplying estimated values of said rotation speed value, said carriage speed and said state variables with respective gains, and adding an output obtained by said averaging step to said multiplied signal to generate said speed control value.

19. The control method claimed in claim 15, wherein said step of generating said angle control value comprises the steps of calculating an angle error between said aimed angle value and said rotation angle value, summing a value obtained by averaging said angle error from an initial time point and then multiplying an averaged angle error with a first coefficient, a value obtained by multiplying said rotation angle value with a second coefficient and a value obtained by multiplying said rotation speed value with a third coefficient and, outputting a resultant sum as said angle control value.

20. The control method claimed in claim 15, wherein said step of selecting comprises the steps of outputting said speed control value as a control drive value when said rotation speed value is larger than said first speed value and outputting said angle control value as the control drive value when said rotation speed value is smaller than said first speed value, stopping an output of said control drive value as said motor drive control value when said rotation speed value and said rotation angle value are lower than a second speed value smaller than said first speed value and smaller than a predetermined angle value, respectively, and, otherwise, outputting said control drive value as said motor drive control value.

21. The method of claim 15 wherein said step of generating a speed control value further comprises the step of generating a state signal by estimating state variables of a power transmission mechanism of said motor and said carriage on the basis of said rotation speed value during closed loop control, and adding said state signal to said difference value to generate a speed control value for making said rotation speed value closer to said set speed value.

* * * * *

UNITED STATES PATENT AND TRADEMARK OFFICE
CERTIFICATE OF CORRECTION

PATENT NO. : 5,433,541
DATED : July 18, 1995
INVENTOR(S) : Tomoharu HIEDA

It is certified that error(s) appears in the above-identified patent and that said Letters Patent is hereby corrected as shown below:

Col. 7, line 53, delete "them" and insert --then--.

Col. 8, line 38, delete "Bd=".

Col. 10, line 1, delete "Ioutput" and insert --output--.

Col. 11, line 5, delete "alogrithm" and insert --algorithm--.

Col. 11, line 59, delete "SNS" and insert --SN8--.

Signed and Sealed this

Twentieth Day of February, 1996

Attest:

BRUCE LEHMAN

Attesting Officer     Commissioner of Patents and Trademarks